(12) United States Patent
Malaiyandi et al.

(10) Patent No.: US 8,301,791 B2
(45) Date of Patent: *Oct. 30, 2012

(54) SYSTEM AND METHOD FOR NON-DISRUPTIVE CHECK OF A MIRROR

(75) Inventors: Prasanna Kumar Malaiyandi, San Jose, CA (US); Varun Khurana, Santa Clara, CA (US); Michael L. Federwisch, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 152 days.

This patent is subject to a terminal disclaimer.

(21) Appl. No.: 12/129,874

(22) Filed: May 30, 2008

(65) Prior Publication Data

US 2009/0030983 A1   Jan. 29, 2009

Related U.S. Application Data

(60) Provisional application No. 60/941,109, filed on Jul. 26, 2007.

(51) Int. Cl.
*G06F 15/16* (2006.01)
(52) U.S. Cl. .................. 709/231; 709/219
(58) Field of Classification Search ............ 709/231, 709/219
See application file for complete search history.

(56) References Cited

U.S. PATENT DOCUMENTS

| | | | |
|---|---|---|---|
| 4,570,217 A | 2/1986 | Allen et al. | |
| 5,124,987 A | 6/1992 | Milligan et al. | |
| 5,163,131 A | 11/1992 | Row et al. | |
| 5,202,979 A | 4/1993 | Hillis et al. | |
| 5,278,979 A | 1/1994 | Foster et al. | |
| 5,403,667 A | 4/1995 | Simoens | |
| 5,581,724 A | 12/1996 | Belsan et al. | |
| 5,819,292 A | 10/1998 | Hitz et al. | |
| 6,061,770 A | 5/2000 | Franklin | |
| 6,081,875 A | 6/2000 | Clifton et al. | |
| 6,341,341 B1 | 1/2002 | Grummon et al. | |
| 6,480,970 B1 | 11/2002 | DeKoning et al. | |
| 6,668,264 B1 | 12/2003 | Patterson et al. | |
| 6,745,303 B2 | 6/2004 | Watanabe | |

(Continued)

OTHER PUBLICATIONS

U.S. Appl. No. 60/941,109, filed May 31, 2007, and accorded filed of Jul. 26, 2007, entitled System and Method for Non-Disruptive Check of a Mirror, by Prasanna Kumar Malaiyandi, et al., 45 pages.

(Continued)

*Primary Examiner* — Ashok Patel
*Assistant Examiner* — Lawrence Cosby
(74) *Attorney, Agent, or Firm* — Cesari and McKenna, LLP

(57) ABSTRACT

A system and method for verifying the consistency of mirrored data sets between source and destination storage systems is provided. A destination verification module sends version information to the source storage system where the source verification module determines whether the source and destination storage systems are utilizing compatible versions of the verification module. If the destination verification module receives an acceptable version from the source, the destination module then determines a base PCPI to utilize for verification and sends a PCPI identifier of the base PCPI to the source. The source verification module generates and transmits a data stream consisting of comprising of checksum information. The destination verification module compares the received data stream with checksum information retrieved from disk. If there are mismatches, i.e. the received data differs from the data retrieved from disk, the destination verification module logs the data mismatches in a verification log file.

23 Claims, 12 Drawing Sheets

U.S. PATENT DOCUMENTS

| | | | |
|---|---|---|---|
| 6,889,228 B1 | 5/2005 | Federwisch et al. | |
| 6,915,316 B1 | 7/2005 | Patterson et al. | |
| 6,993,539 B2 | 1/2006 | Federwisch et al. | |
| 7,007,046 B2 | 2/2006 | Manley et al. | |
| 7,010,553 B2 | 3/2006 | Chen et al. | |
| 7,039,663 B1 | 5/2006 | Federwisch et al. | |
| 7,043,485 B2 | 5/2006 | Manley et al. | |
| 7,117,323 B1 | 10/2006 | Delaney | |
| 7,127,577 B2 | 10/2006 | Koning et al. | |
| 7,203,796 B1 | 4/2007 | Muppalaneni et al. | |
| 7,225,204 B2 | 5/2007 | Manley et al. | |
| 7,325,109 B1 | 1/2008 | Muppalaneni et al. | |
| 7,337,194 B2 | 2/2008 | Goyal | |
| 7,464,238 B1* | 12/2008 | Yadav | 711/162 |
| 7,603,391 B1 | 10/2009 | Federwisch et al. | |
| 8,010,509 B1* | 8/2011 | Khurana et al. | 707/690 |
| 2002/0083037 A1 | 6/2002 | Lewis et al. | |
| 2003/0158873 A1 | 8/2003 | Sawdon et al. | |
| 2003/0159007 A1 | 8/2003 | Sawdon et al. | |
| 2003/0182322 A1* | 9/2003 | Manley et al. | 707/201 |
| 2004/0030668 A1 | 2/2004 | Pawlowski et al. | |
| 2005/0144202 A1 | 6/2005 | Chen | |
| 2006/0010227 A1* | 1/2006 | Atluri | 709/217 |
| 2006/0010299 A1* | 1/2006 | Zhang et al. | 711/162 |
| 2006/0036648 A1* | 2/2006 | Frey et al. | 707/200 |
| 2006/0184587 A1 | 8/2006 | Federwisch et al. | |
| 2006/0218210 A1 | 9/2006 | Sarma et al. | |
| 2007/0088754 A1 | 4/2007 | Brannon et al. | |
| 2009/0006792 A1 | 1/2009 | Federwisch et al. | |

OTHER PUBLICATIONS

U.S. Appl. No. 11/478,931, filed Jun. 30, 2006, entitled System and Method for Verifying and Correcting the Consistency of Mirrored Data Sets, by Varun Khurana, et al., 39 pages.

Patterson, David A., et al., "A Case for Redundant Arrays of Inexpensive Disks (RAID)", Proceedings of the International Conference on Management of Data (SIGMOD), Jun. 1988, pp. 109-116.

Hitz, Dave, et al., "File System Design for an NFS File Server Appliance", Technical Report 3002, Presented Jan. 19, 1994, USENIX Winter 1994, San Francisco, CA, The USENIX Association, Network Appliance, Rev. C3/95, 23 pages.

Akyurek, Sedat, *Placing Replicated Data to Reduce Seek Delays*, Department of Computer Science, University of Maryland, UMIACS-TR-91-121, CS-TR-2746, Aug. 1991.

Bitton, Dina, *Disk Shadowing*, Proceedings of the 14th VLDB Conference, LA, CA 1988.

Chaudhuri, Surajit, et al., *Self-Tuning Technology in Microsoft SQL Server*, Data Engineering Journal 22, Feb. 1999 pp. 20-27.

Chutani, Sailesh, et al., *The Episode File System*, In Proceedings of the USENIX Winter 1992.

Coyne, Robert A., et al., *Storage Systems for National Information Assets*, Proc. Supercomputing 92, Minneapolis, Nov. 1992, pp. 626-633.

Finlayson, Ross S., et al., *Log Files: An Extended File Service Exploiting Write-Once Storage* Department of Computer Science, Stanford University, Report No. STAN-CS-87/1177, Sep. 1987.

Gray, Jim, et al., *The Recovery Manager of the System R Database Manager*, ACM Computing Surveys, (13)2:223-242 1981.

Hecht, Matthew S., et al. *Shadowed Management of Free Disk Pages with a Linked List*, ACM Transactions on Database Systems, 8/4, Dec. 1983, pp. 503-514.

Howard, John, H. et al., *Scale and Performance in a Distributed File System*, Carnegie Mellon University, CMU-ITC-87-068, Aug. 1987.

Howard, John H., *An Overview of the Andrew File System*, Carnegie Mellon University, CMU-ITC-88-062 1988.

Howard, John, H. et al., *Scale and Performance in a Distributed File System*, ACM Trans. Computer System, 6(1), Feb. 1988 pp. 51-81.

Kazar, Michael Leon, *Synchronization and Caching Issues in the Andrew File System*, Carnegie Mellon University, CMU-ITC-88-063.

Kazar, Michael L., et al., *DEcorum File System Architectural Overview*, USENIX Summer Conference, Anaheim, California, 1990.

Kemper, Alfons, et al., *Performance Tuning for SAP R/3*, Data Engineering Journal 22, Feb. 1999 pp. 33-40.

Kent, Jack et al., *Optimizing Shadow Recovery Algorithms*, IEEE Transactions on Software Engineering, 14( 2): 155-168 , Feb. 1988.

Kistler, et al., *Disconnected Operation in the Coda File System*, ACM Transactions on Computer Systems, vol. 10, No. 1, Feb. 1992, pp. 3-25.

Lorie, Raymond, A. *Physical Integrity in a Large Segmented Database*, ACM Trans. Database Syst., vol. 2, Mar. 1977, pp. 91-104.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.

Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.

Quinlan, Sean, *A Cached WORM File System*, Software-Practice and Experience, 21(12):1289-1299 1991.

Rosenblum, Mendel, et al., *The LFS Storage Manager*, Computer Science Division, Electrical Engineering and Computer Sciences, Univ. of CA, presented at Summer '90 USENIX Technical Conference, Anaheim, CA Jun. 1990.

Rosenblum, Mendel, et al. *The Design and Implementation of a Log-Structured File System* Jul. 24, 1991 pp. 1-15.

Rosenblum, Mendel, *The Design and Implementation of a Log-Structured File System*, 1992 pp. 1-93.

Rosenblum, Mendel, et al., *The Design and Implementation of a Log-Structured File System*, In Proceedings of ACM Transactions on Computer Systems, (10)1:26-52, Feb. 1992.

Schiefer, Berni, et al., *DB2 Universal Database Performance Tuning*, Data Engineering Journal 22, Feb. 1999 pp. 12-19.

Seltzer, Margo I., et al., *Journaling Versus Soft Updates: Asynchronous Meta-Data Protection in File Systems*, Proceedings of 200 USENIX Annual Technical Conference, Jun. 18-23, 2000.

Shasha, Dennis, *Tuning Time Series Queries in Finance: Case Studies and Recommendations*, Data Engineering Journal 22, Feb. 1999 pp. 41-47.

Sidebotham, Bob, Volumes: *The Andrew File System Data Structuring Primitive*, EEUG Conference Proceedings, Manchester, UK, Autumn 1986.

Subramanian, Muralidhar, et al., *Performance Challenges in Object-Relational DBMSs*, Data Engineering Journal 22, Feb. 1999 pp. 28-32.

Weikum, Gerhard, et al., *Towards Self-Tuning Memory Management for Data Servers*, Data Engineering Journal 22, Feb. 1999 pp. 3-11.

West, Michael, et al. *The ITC Distributed File System: Prototype and Experience*, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

* cited by examiner

SYSTEM AND METHOD FOR NON-DISRUPTIVE CHECK OF A MIRROR

RELATED APPLICATION

The present invention claims priority to U.S. Provisional Patent Application Ser. No. 60/941,109, and accorded filing date of Jul. 26, 2007, entitled SYSTEM AND METHOD FOR NON-DISRUPTIVE CHECK OF A MIRROR, by Prasanna Malaiyandi et al., the contents of which are hereby incorporated by reference.

The present invention is related to the U.S. Pat. No. 8,010,509, entitled SYSTEM AND METHOD FOR VERIFYING AND CORRECTING THE CONSISTENCY OF MIRRORED DATA SETS, by Varun Khurana and Prasanna Malaiyandi, the contents of which are hereby incorporated by reference.

FIELD OF THE INVENTION

This invention relates to storage systems and more particularly to verifying the consistency of mirrored data sets on storage systems.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes" of physical disks, defining an overall logical arrangement of disk space. The disks within a volume are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information (parity) with respect to the striped data. The physical disks of each RAID group may include disks configured to store striped data (i.e., data disks) and disks configured to store parity for the data (i.e., parity disks). The parity may thereafter be retrieved to enable recovery of data lost when a disk fails. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

The storage operating system of the storage system may implement a high-level module, such as a file system, to logically organize the information stored on the disks as a hierarchical structure of directories, files and blocks. For example, each "on-disk" file may be implemented as set of data structures, i.e., disk blocks, configured to store information, such as the actual data for the file. These data blocks are organized within a volume block number (vbn) space that is maintained by the file system. The file system organizes the data blocks within the vbn space as a "logical volume"; each logical volume may be, although is not necessarily, associated with its own file system. The file system typically consists of a contiguous range of vbns from zero to n, for a file system of size n+1 blocks.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from Network Appliance, Inc., Sunnyvale, Calif.

The storage operating system may further implement a storage module, such as a RAID system, that manages the storage and retrieval of the information to and from the disks in accordance with input/output (I/O) operations. The RAID system is also responsible for parity operations in the storage system. Note that the file system only "sees" the data disks within its vbn space; the parity disks are "hidden" from the file system and, thus, are only visible to the RAID system. The RAID system typically organizes the RAID groups into one large "physical" disk (i.e., a physical volume), such that the disk blocks are concatenated across all disks of all RAID groups. The logical volume maintained by the file system is then "disposed over" (spread over) the physical volume maintained by the RAID system.

The storage system may be configured to operate according to a client/server model of information delivery to thereby allow many clients to access the directories, files and blocks stored on the system. In this model, the client may comprise an application, such as a database application, executing on a computer that "connects" to the storage system over a computer network, such as a point-to-point link, shared local area network, wide area network or virtual private network implemented over a public network, such as the Internet. Each client may request the services of the file system by issuing file system protocol messages (in the form of packets) to the storage system over the network. By supporting a plurality of file system protocols, such as the conventional Common Internet File System (CIFS) and the Network File System (NFS) protocols, the utility of the storage system is enhanced.

In order to improve reliability and facilitate disaster recovery in the event of a failure of a storage system, its associated disks or some portion of the storage infrastructure, it is common to mirror (or replicate) a data set comprising some or all of the underlying data and/or the file system that organizes the data. A data set comprises an area of defined storage which may have a mirroring relationship associated therewith. Examples of data sets include, e.g., a file system, a volume or a persistent consistency point image (PCPI), described further below.

In one example, a mirror is established and stored at a destination storage system, making it more likely that recovery is possible in the event of a true disaster (e.g. a flood, power outage, act of war, etc.) that may physically damage a source storage system location or its infrastructure. The mirror is updated at regular intervals, typically set by an administrator, in an effort to maintain the most recent changes to the file system on the destination storage system. That is, the storage systems cooperate to ensure that the mirror is consistent, i.e., that the mirror on the destination storage system contains identical data to that of the source storage system.

One common form of update involves the use of a "snapshot" process in which an active file system at the source storage system, consisting of inodes and blocks, is captured and the changes between two snapshots are transmitted over a network (such as the well-known Internet) to the remote destination storage system. By "active file system" it is meant the file system to which current input/output operations are being directed.

Note that the term "snapshot" is a trademark of Network Appliance, Inc. It is used for purposes of this patent to designate a persistent consistency point image (PCPI). A persistent consistency point image is a point in time representation of the storage system, and more particularly, of the active file system, stored on a storage device or in other persistent memory and having a name or other unique identifier that distinguishes it from other PCPIs taken at other points in time. A PCPI can also include other information (metadata) about the active file system at the particular point in time for which the image is taken. The terms PCPI and snapshot may be used interchangeably through out this patent without derogation of Network Appliance's is trademark rights. The PCPI process is described in further detail in U.S. patent application Ser. No. 09/932,578, entitled INSTANT SNAPSHOT by Blake Lewis et al., now issued as U.S. Pat. No. 7,454,445 on Nov. 18, 2008, TR3002 File System Design for an NFS File Server Appliance by Dave Hitz et al., published by Network Appliance, Inc., and in U.S. Pat. No. 5,819,292 entitled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., which are hereby incorporated by reference.

An exemplary PCPI-based mirroring technique typically provides remote asynchronous replication or mirroring of changes made to a source file system in a destination replica file system. Broadly stated, the mirroring technique typically scans (via a scanner) the blocks that make up two versions of a PCPI of the source file system to identify latent divergence, i.e., changed blocks, in the respective PCPI files, based upon differences in vbns further identified in a scan of a logical file block index of each PCPI. Trees (e.g., buffer trees) of blocks associated with the files are traversed, bypassing unchanged pointers between versions, to identify the changes in the hierarchy of the trees. These changes are transmitted to the destination replica. This technique allows regular files, directories, inodes and any other hierarchical structure of trees to be efficiently scanned to determine differences (latent divergence) between versions thereof. A set number of PCPIs may be retained both on the source and destination file systems depending upon various time-based and other criteria.

Conventional mirroring and archival backup systems typically include processes to ensure that the data set is correctly mirrored, to thereby reduce the divergence of the replica (i.e. mirror) from the original source file system. However, errors may occur in the mirror due to, e.g., network, software and/or physical media malfunctions of the storage devices. As a result of such errors, the mirror is not identical to the source file system, which may cause data loss should an error condition occur on the source storage system. Additionally, the file systems on either the source or destination storage systems may experience an error condition. The file system error may be corrected by conventional file system error correction techniques; however, such correction may exacerbate mirror divergence. Additionally, as the destination is typically a read-only volume, to correct the destination requires that the mirroring relationship be broken and the destination volume converted to a read/write volume. To ensure that a correct mirror is on the destination storage system, a new mirroring relationship may need to be established that includes an initial baseline backup operation performed on the data set. Establishment of the mirroring relationship is computationally, I/O resource and network intensive, and does not guarantee that the administrator has retained one or more point in time mirrors of file system images previous to the establishment of the new mirroring relationship. That is, although the new mirror may be up to date, it does not reflect the contents of the mirrored source storage system at a previous point in time, thereby reducing the effectiveness of the mirror.

Furthermore, a noted disadvantage of a performing various verification techniques is that the verification techniques may prevent backup operations from occurring. Such a disruption of backup operation schedules may result in the reduction of consistency and/or usefulness of the backup data by increasing the amount of time between backup operations. These increased changes to the backup schedule result in a loss of synchronization between the source and destination storage systems. If the source storage system then fails, the destination storage system may be out of sync by a potentially substantial amount of time, which may result in data loss for any data written and/or modified during that time period.

SUMMARY OF THE INVENTION

The disadvantages of the prior art are overcome by providing a system and method for verifying the consistency of mirrored data sets between source and destination storage systems. The present invention is illustratively implemented as a "destination" verification module of a storage operating system executing on the destination storage system that cooperates with a "source" verification module executing on the source storage system.

Upon initialization of a verification procedure, the destination verification module sends version information to the source storage system where the source verification module determines whether the source and destination storage systems are utilizing compatible versions of the verification module. If the destination verification module receives an acceptable version from the source, the destination module then determines a base PCPI to utilize for verification and sends a PCPI identifier of the base PCPI to the source. In response, source verification module sends a list of PCPI's to be verified to the destination verification module.

Furthermore, the source verification module generates and transmits a data stream consisting of comprising of checksum information. The destination verification module compares the received data stream with checksum information retrieved from disk. If there are mismatches, i.e. the received data differs from the data retrieved from disk, the destination verification module logs the data mismatches in a verification log file. Such a log file may be utilized in a later correction procedure to render the destination consistent with the source.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN
ILLUSTRATIVE EMBODIMENT

A. Network and Storage System Environment

Figure 1:
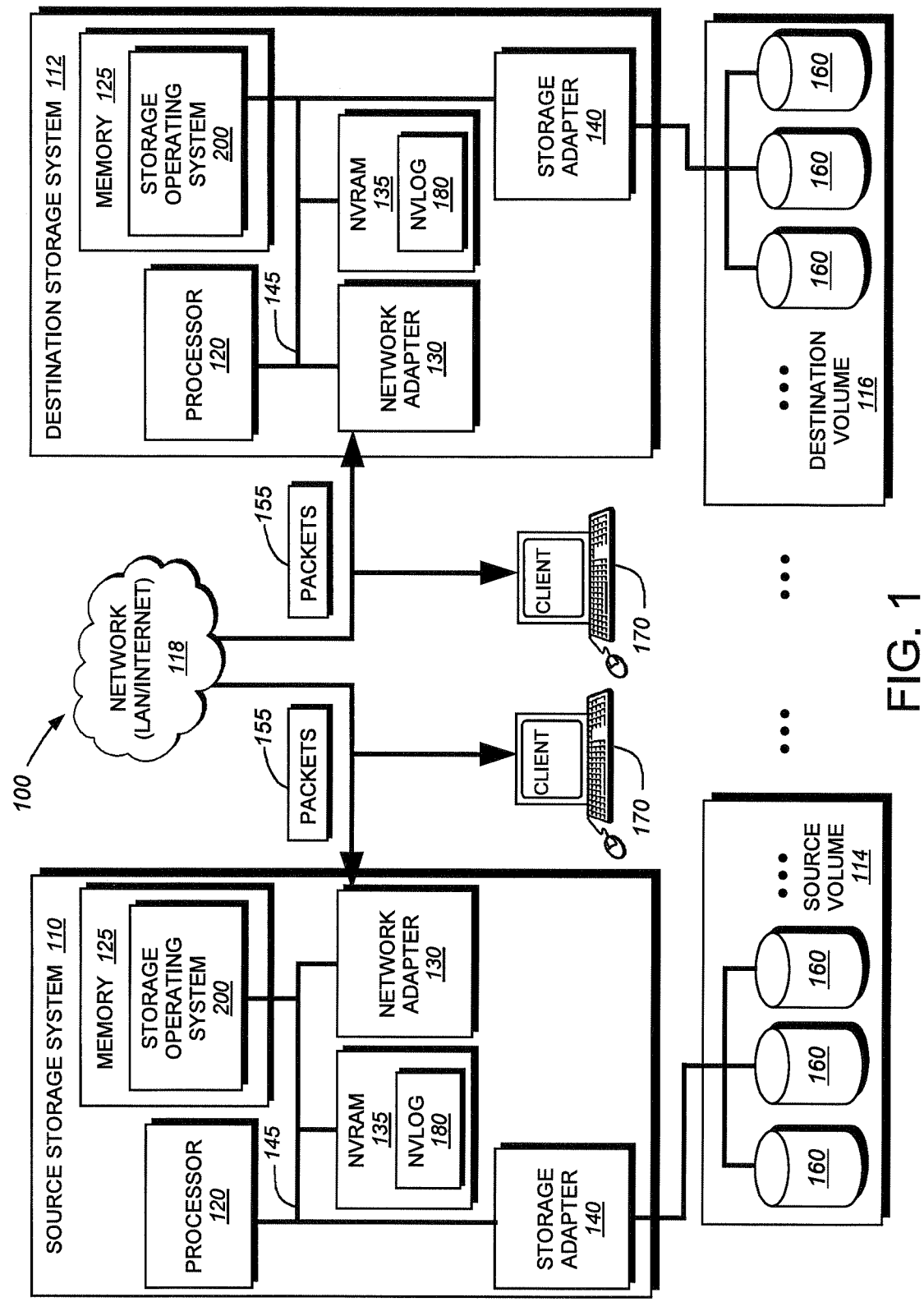
FIG. 1 is a schematic block diagram of an exemplary mirrored storage system environment in accordance with an embodiment of the present invention.

FIG. 1 is a schematic block diagram of a storage system environment 100 that includes a pair of interconnected storage systems including a source storage system 110 and a destination storage system 112 that may be advantageously used with the present invention. For the purposes of this description, the source storage system is a networked computer that manages storage on one or more source volumes 114, each comprising an array of storage disks 160 (described further below). Likewise, the destination storage system 112 manages the storage on one or more destination volumes 116 comprising arrays of disks 160. The source and destination storage systems are linked via a network 118 that can comprise a local or wide area network, such as the well-known Internet. An appropriate network adapter 130 residing in each storage system 110, 112 facilitates communication over the network 118. Also for the purposes of this description, like components in each of the source and destination storage system 110 and 112 respectively, are described with like reference numerals. As used herein, the term "source" can be broadly defined as a location from which the subject data travels during a mirroring operation and the term "destination" can be defined as the location to which the data travels. While a source storage system and a destination storage system, connected by a network, is a particular example of a source and destination used herein, a source and destination could be computers/storage systems linked via a direct link, or via loopback (a "networking" arrangement internal to a single computer for transmitting a data stream between local source and local destination), in which case the source and the destination are the same storage system.

In the particular example of a pair of networked source and destination storage systems, each storage system 110 and 112 can be any type of special-purpose computer (e.g., server) or general-purpose computer, including a standalone computer. Each storage system 110, 112 comprises a processor 120, a memory 125, a network adapter 130 and a storage adapter 140 interconnected by a system bus 145. Each storage system 110, 112 also includes a storage operating system 200 that manages data and may implement a file system to logically organize the information as a hierarchical structure of directories and files on the disks.

It will be understood to those skilled in the art that the inventive technique described herein may apply to any type of special-purpose computer (e.g., file serving appliance) or general-purpose computer, including a standalone computer, embodied as a storage system. An example of a storage system that may be advantageously used with the present invention is described in U.S. Pat. No. 7,873,700 titled, MULTI-PROTOCOL STORAGE APPLIANCE THAT PROVIDES INTEGRATED SUPPORT FOR FILE AND BLOCK ACCESS PROTOCOLS, filed on Aug. 9, 2002, and issued on Jan. 18, 2012. Moreover, the teachings of this invention can be adapted to a variety of storage system architectures including, but not limited to, a network-attached storage (NAS) environment, a storage area network (SAN) and disk assembly directly-attached to a client or host computer. The term "storage system" should therefore be taken broadly to include such arrangements in addition to any subsystems configured to perform a storage function and associated with other equipment or systems.

In the illustrative embodiment, the memory 125 comprises storage locations that are addressable by the processor and adapters for storing software program code and data structures. The memory comprises a form of random access memory (RAM) that is generally cleared by a power cycle or other reboot operation (i.e., it is "volatile" memory). The processor and adapters may, in turn, comprise processing elements and/or logic circuitry configured to execute the software code and manipulate the data structures. The operating system 200, portions of which are typically resident in memory and executed by the processing elements, functionally organizes the storage system by, inter alia, invoking storage operations in support of a file service implemented by the storage system. It will be apparent to those skilled in the art that other processing and memory means, including various computer readable media, may be used for storing and executing program instructions pertaining to the inventive technique described herein.

The network adapter 130 comprises the mechanical, electrical and signaling circuitry needed to connect each storage system 110, 112 to the network 118, which may comprise a point-to-point connection or a shared medium, such as a local area network. Each storage system may also be interconnected with one or more clients 170 via the network adapter 130. The clients transmit requests for file service to the source and destination storage systems 110, 112, respectively, and receive responses to the requests over a LAN or other network (118). The client 170 may communicate with the storage system over network 118 by exchanging discrete frames or packets of data according to predefined protocols, such as the Transmission Control Protocol/Internet Protocol (TCP/IP).

Moreover, the client may interact with the storage system 110, 112 in accordance with a client/server model of information delivery. That is, the client may request the services of the storage system, and the system may return the results of the services requested by the client, by exchanging packets 155 over the network 118. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 140 cooperates with the storage operating system 200 executing on the storage system to access information requested by the client. The information may be stored on the disks 160 that are attached, via the storage adapter 140 to each storage system 110, 112 or other node of a storage system as defined herein. The storage adapter 140 includes input/output (I/O) interface circuitry that couples to the disks over an I/O interconnect arrangement, such as a conventional high-performance, Fibre Channel serial link topology. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 160, such as hard disk drivers (HDD) and/or direct attached storage devices (DASD).

Storage of information on disks 160 is preferably implemented as one or more storage "volumes" that comprise a collection of physical storage disks 160 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

B. Storage Operating System

To facilitate access to the disks 160, the storage operating system 200 illustratively implements a write-anywhere file system that cooperates with virtualization modules to "virtualize" the storage space provided by disks 160. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

In the illustrative embodiment, the storage operating system is illustratively the NetApp® Data ONTAP® operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "Data ONTAP" is employed, it should be taken broadly to refer to any storage operating system that is otherwise adaptable to the teachings of this invention.

Figure 2:
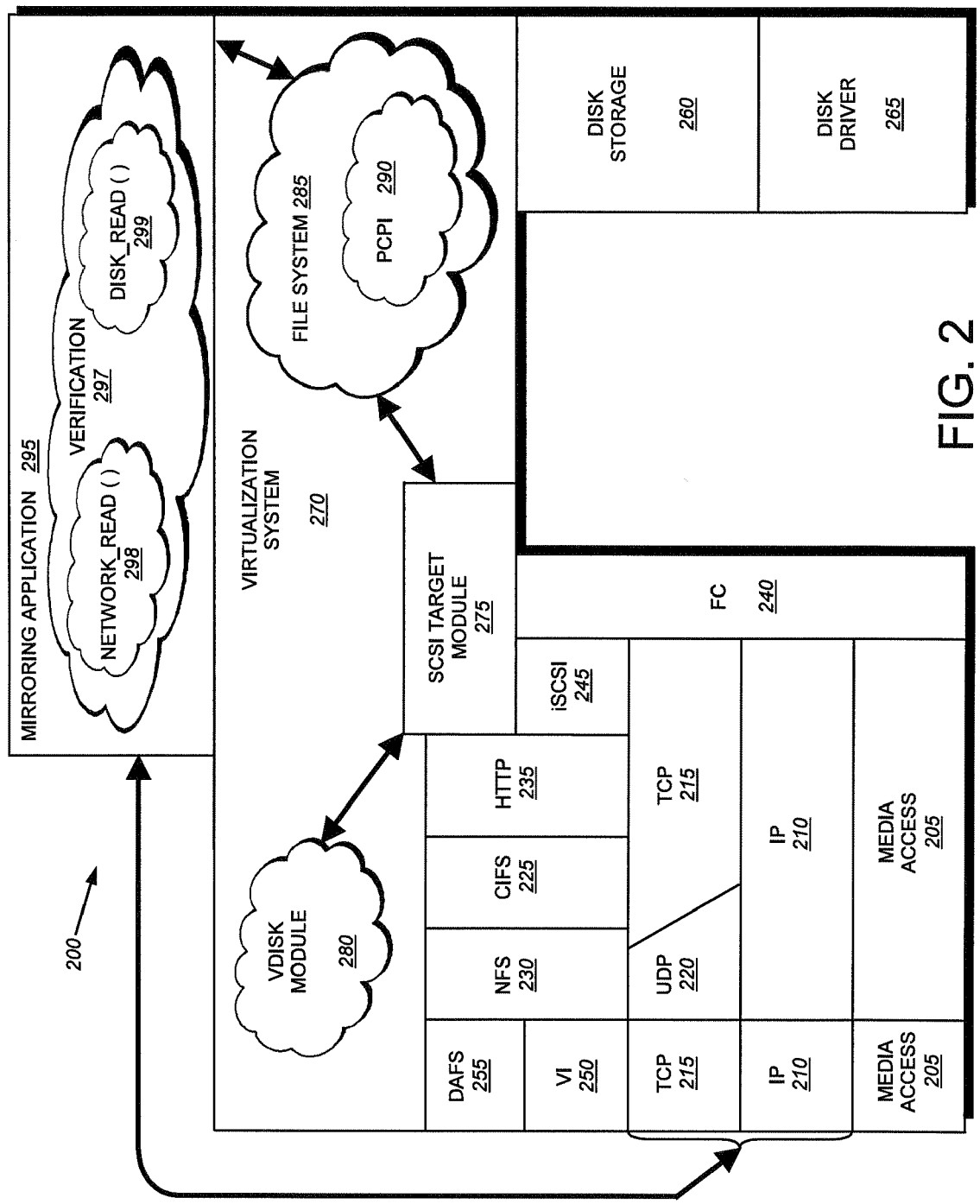
FIG. 2 is a schematic block diagram of an exemplary storage operating system in accordance with an embodiment of the present invention.

FIG. 2 is a schematic block diagram of an exemplary storage operating system 200 that may be advantageously used with the present invention. The storage operating system comprises a series of software modules organized to form an integrated network protocol stack or, more generally, a multi-protocol engine that provides data paths for clients to access information stored on the storage system using block and file access protocols. The protocol stack includes a media access layer 205 of network drivers (e.g., gigabit Ethernet drivers) that interfaces to network protocol layers, such as the IP layer 210 and its supporting transport mechanisms, the TCP layer 215 and the User Datagram Protocol (UDP) layer 220. A file system protocol layer provides multi-protocol file access and, to that end, includes support for the Direct Access File System (DAFS) protocol 255, the NFS protocol 230, the CIFS protocol 225 and the Hypertext Transfer Protocol (HTTP) protocol 235. A VI layer 250 implements the VI architecture to provide direct access transport (DAT) capabilities, such as RDMA, as required by the DAFS protocol.

An iSCSI driver layer 245 provides block protocol access over the TCP/IP network protocol layers, while a FC driver layer 240 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a disk storage module 260 embodied as a RAID system that manages the storage and retrieval of information to and from the volumes/disks in accordance with I/O operations, and a disk driver system 265 that implements a disk access protocol such as, e.g., the SCSI protocol.

Bridging the disk software layers with the integrated network protocol stack layers is a virtualization system 270 that is implemented by a file system interacting with virtualization modules illustratively embodied as, e.g., vdisk module 280 and SCSI target module 275. The vdisk module 280 is layered on the file system to enable access by administrative interfaces, such as a user interface (UI), in response to a user (system administrator) issuing commands to the storage system. The SCSI target is disposed between the FC and iSCSI drivers and the file system to provide a translation layer of the virtualization system between the block (lun) space and the file system space, where luns are represented as blocks.

The file system is illustratively a message-based system that provides logical volume management capabilities for use in access to the information stored on the storage devices, such as disks. That is, in addition to providing file system semantics, the file system provides functions normally associated with a volume manager. These functions include (i) aggregation of the disks, (ii) aggregation of storage bandwidth of the disks, and (iii) reliability guarantees, such as mirroring and/or parity (RAID). The file system illustratively implements the WAFL file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. A file system (FS) info block specifies the layout of information in the file system and includes an inode of a file that includes all other inodes of the file system. Each logical volume (file system) has an FS info block that is preferably stored at a fixed location within, e.g., a RAID group. The inode of the root FS info block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file.

Operationally, a request from the client is forwarded as a packet 155 over the computer network 118 and onto the storage system where it is received at the network adapter. A network driver (of layer 205 or layer 240) processes the packet and, if appropriate, passes it on to a network protocol and file access layer for additional processing prior to forwarding to the write-anywhere file system 285. Here, the file system generates operations to load (retrieve) the requested data from disk if it is not resident "in core," i.e., in memory 125. If the information is not in the memory, the file system indexes into the inode file using the inode number to access an appropriate entry and retrieve a logical vbn. The file system then passes a message structure including the logical vbn to the RAID system 260; the logical vbn is mapped to a disk identifier and disk block number (disk,dbn) and sent to an appropriate driver (e.g., SCSI) of the disk driver system 265. The disk driver accesses the dbn from the specified disk and loads the requested data block(s) in memory 125 for processing by the storage system. Upon completion of the request, the storage system (and operating system) returns a reply to the client over the network 118.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system in response to a request issued by client 170. Moreover, in another alternate embodiment of the invention, the processing elements of adapters 130, 140 may be configured to offload some or all of the packet processing and storage access operations, respectively, from processor 120, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may, in the case of a file server, implement file system semantics. In this sense, the Data ONTAP software is an example of such a storage operating system implemented as a microkernel and including a file system 285 to implement the WAFL file system semantics and manage data access. The storage operating system can also be implemented as an application program operating over a general-purpose operating system, such as UNIX® or Windows XP®, or as a general-purpose operating system with configurable functionality, which is configured for storage applications as described herein.

The file system 285 also includes a set of PCPI processes 290 that enable the file system to generate PCPIs of the active file system, as described further below. Also included within the storage operating system 200 is a mirroring application module 295. The mirroring application module 295 illustratively generates appropriate mirrors (or other replicas) of data sets and manages data backups in accordance with an embodiment of the present invention. In accordance with an illustrative embodiment of the present invention, a verification module 297 is associated with the mirroring application module 295. The verification module 297 illustratively performs verification of mirrored data sets in accordance with the teachings of the present invention, as described further below. Included within verification module 297 are a Network_Read( ) process 298 and a Disk_Read( ) process 299. These processes 298, 299, described further below, read incoming checksum information from the source storage system (Network_Read( )) or from storage devices (Disk_Read( )) to compare during verification.

C. Persistent Consistency Point Images

As noted above, in certain mirroring architectures, storage systems utilize PCPIs. For example, source storage system 110 ("source") may generate a baseline PCPI that is transferred to destination storage system 112 ("destination"). At a later point in time, the source storage system may generate a second PCPI. The mirroring application module 295 determines the changes between the baseline and the second PCPIs, with only those changes being transmitted to the destination, which may then update its file system and generate a second PCPI so that the baseline and second PCPIs are identical on both the source and destination.

PCPIs are generally created on some regular schedule that may be subject to great variation. In addition, the number of PCPIs retained by the storage system is highly variable. Under one storage scheme, a number of recent PCPIs is stored in succession (for example, a few days worth of PCPIs each taken at four-hour intervals), and a number of older PCPIs is retained at increasing time spacings (for example, a number of daily PCPIs for the previous week(s) and weekly PCPI for the previous few months). Each PCPI is stored on-disk along with the active file system, and is called into the memory 125 of the storage system as requested by the storage operating system 200 or mirroring application 295. However, it is contemplated that a variety of PCPI creation techniques and timing schemes can be implemented within the teachings of this invention.

Figure 3:
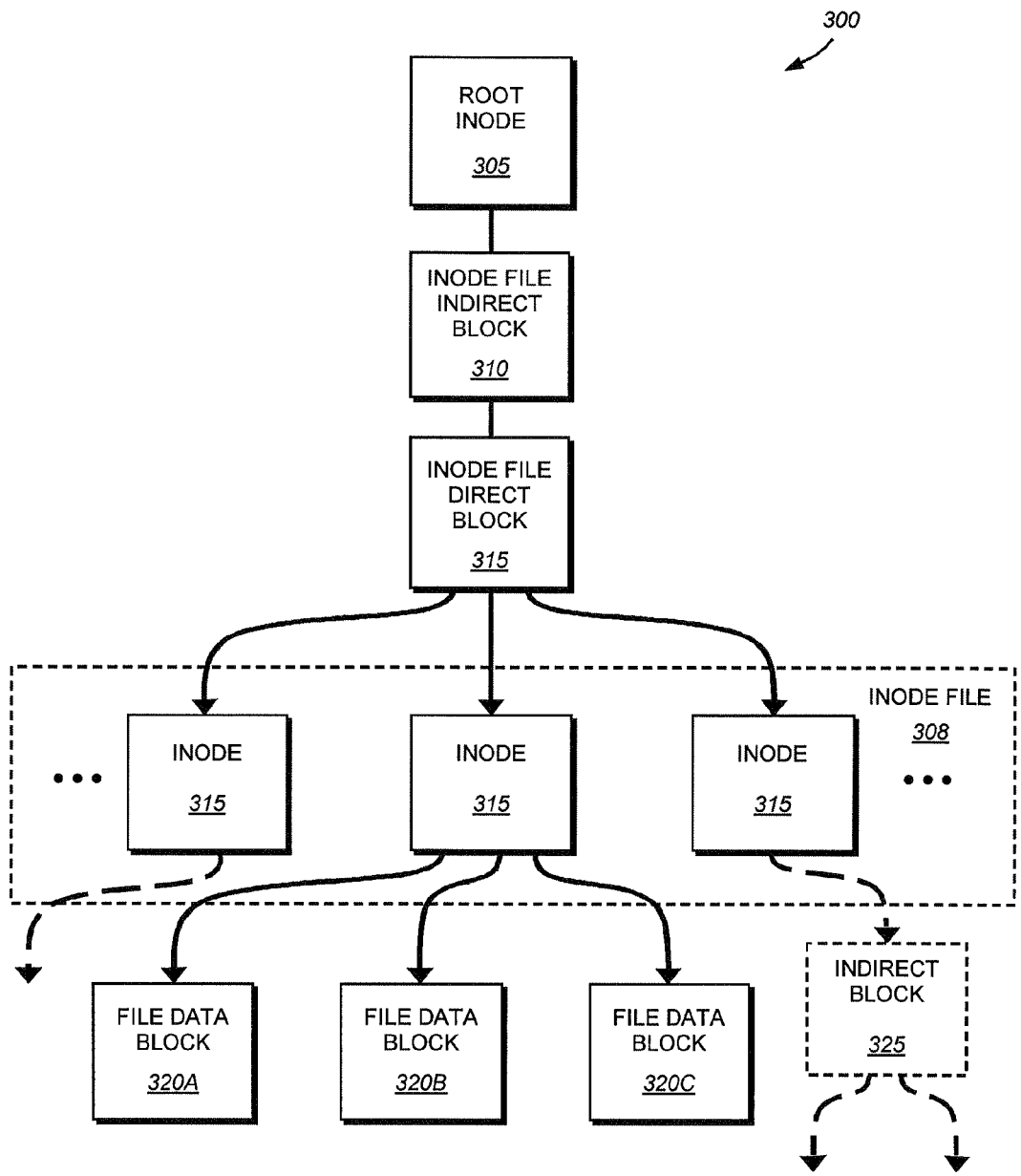
FIG. 3 is a schematic block diagram of an exemplary inode buffer tree in accordance with an embodiment of the present invention.

An exemplary file system inode structure 300 according to an illustrative embodiment is shown in FIG. 3. The inode for the inode file or more generally, the "root" inode 305 contains information describing inode file 308 associated with a given file system. In this exemplary file system inode structure root inode 305 contains a pointer to the inode file indirect block 310. The inode file indirect block 310 points to one or more inode file direct blocks 312, each containing a set of pointers to inodes 315 that make up the inode file 308. The depicted subject inode file 308 is organized into volume blocks (not separately shown) made up of inodes 315 which, in turn, contain pointers to file data (or "disk") blocks 320A, 320B and 320C. In the diagram, this is simplified to show just the inode itself containing pointers to the file data blocks. Each of the file data blocks 320(A-C) is adapted to store, in the illustrative embodiment, 4 kilobytes (KB) of data. Note, however, where more than a predetermined number of file data blocks are referenced by an inode (315), one or more indirect blocks 325 (shown in phantom) are used. These indirect blocks point to associated file data blocks (not shown).

Figure 4:
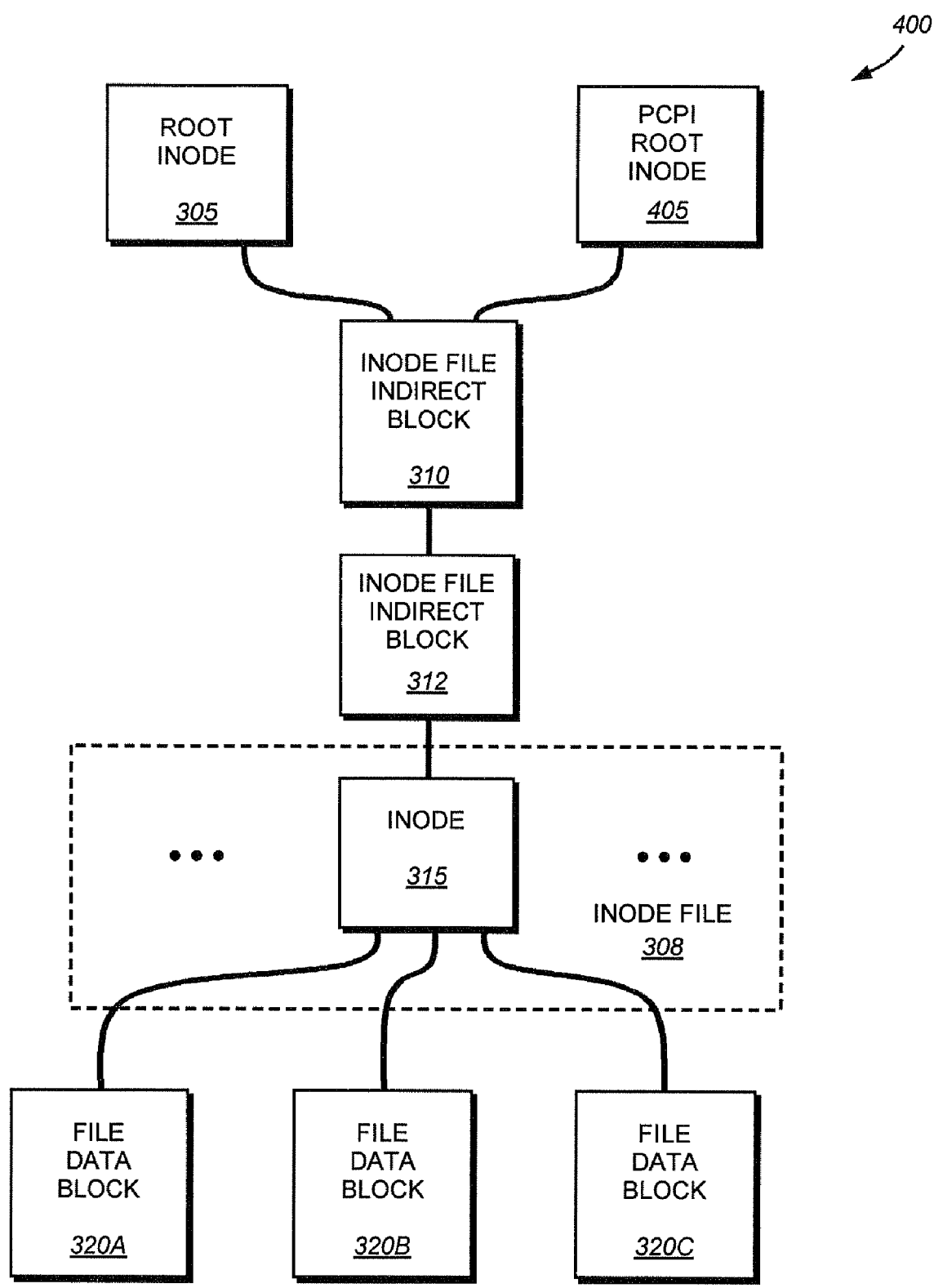
FIG. 4 is a schematic block diagram of an exemplary inode buffer tree showing a persistent consistency point image inode in accordance with an embodiment of the present invention.

When the file system generates a PCPI of a given file system, a PCPI root inode is generated as shown in FIG. 4. The PCPI root inode 405 is, in essence, a duplicate copy of the root inode 305 of the file system 300. Thus, the exemplary file system structure 400 includes the same inode file indirect block 310, inode file direct block 312, inodes 315 and file data blocks 320(A-C) as depicted in FIG. 3. When a user modifies a file data block, the file system writes the new data block to disk and changes the active file system to point to the newly created block.

Figure 5:
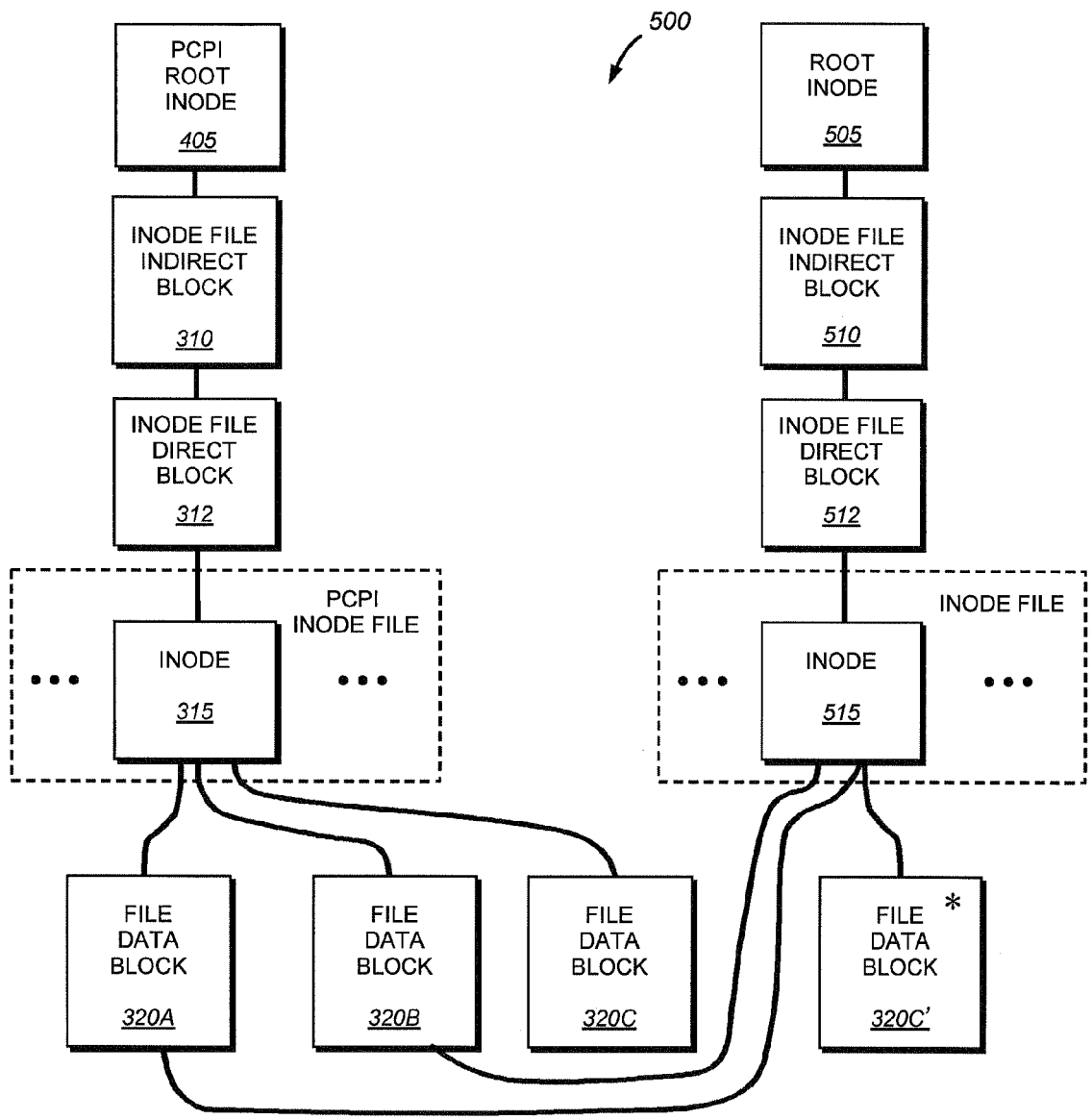
FIG. 5 is a schematic block diagram of an exemplary inode buffer tree showing the copy on write nature of a file system in accordance with an embodiment of the present invention.

FIG. 5 shows an exemplary inode file system structure 500 after a file data block has been modified. In this illustrative example, file data which is stored at disk block 320C is modified. The file system writes the modified contents to disk block 320C', which is a new location on disk. Because of this new location, the inode file data which is stored at disk block 315 is rewritten so that it points to block 320C'. This modification causes the file system to allocate a new disk block 515 for the updated version of the data at 315. Similarly, the inode file indirect block 310 is rewritten to block 510 and direct block 312 is rewritten to block 512, to point to the newly revised inode 515. Thus, after a file data block has been modified the PCPI root inode 405 contains a pointer to the original inode file system indirect block 310 which, in turn, contains a link to the inode 315. This inode 315 contains pointers to the original file data blocks 320A, 320B and 320C. However, the newly written inode 515 includes pointers to unmodified file data blocks 320A and 320B. The inode 515 also contains a pointer to the modified file data block 320C' representing the new arrangement of the active file system. A new file system root inode 505 is established representing the new structure 500. Note that metadata in any PCPI blocks (e.g. blocks 310, 315 and 320C) protects these blocks from being recycled or overwritten until they are released from all PCPIs. Thus, while the active file system root inode 505 points to new blocks 510, 512, 515 and 320C', the old blocks 310, 315 and 320C are retained until the PCPI is fully released.

In accordance with an illustrative embodiment of the present invention, the mirroring application module 295 may permit the mirroring of various PCPIs between the source and destination. This may be due to, for example, incremental changes that are sent at various points in time, which are represented within the file systems as persistent consistency point images (PCPIs). Typically, a first PCPI is utilized to perform a baseline backup to the destination. At some later point in time a second PCPI is generated, which is compared with the first PCPI to generate a set of changes that is transferred to the destination.

D. Verification of Mirrored Data Sets

The present invention provides a system and method for verifying the consistency of mirrored data sets between source and destination storage systems. The present invention is illustratively implemented as a "destination" verification module of a storage operating system executing on the destination storage system that cooperates with a "source" verification module executing on the source storage system.

Upon initialization of a verification procedure, the destination verification module sends version information to the source storage system where the source verification module determines whether the source and destination storage systems are utilizing compatible versions of the verification module. If the destination verification module receives an acceptable version from the source, the destination module then determines a base PCPI to utilize for verification and sends a PCPI identifier of the base PCPI to the source. In response, source verification module sends a list of PCPI's to be verified to the destination verification module.

Furthermore, the source verification module generates and transmits a data stream consisting of comprising of checksum information. The destination verification module compares the received data stream with checksum information retrieved from disk. If there are mismatches, i.e. the received data differs from the data retrieved from disk, the destination verification module logs the data mismatches in a verification log file. Such a log file may be utilized in a later correction procedure to render the destination consistent with the source.

Figure 6:
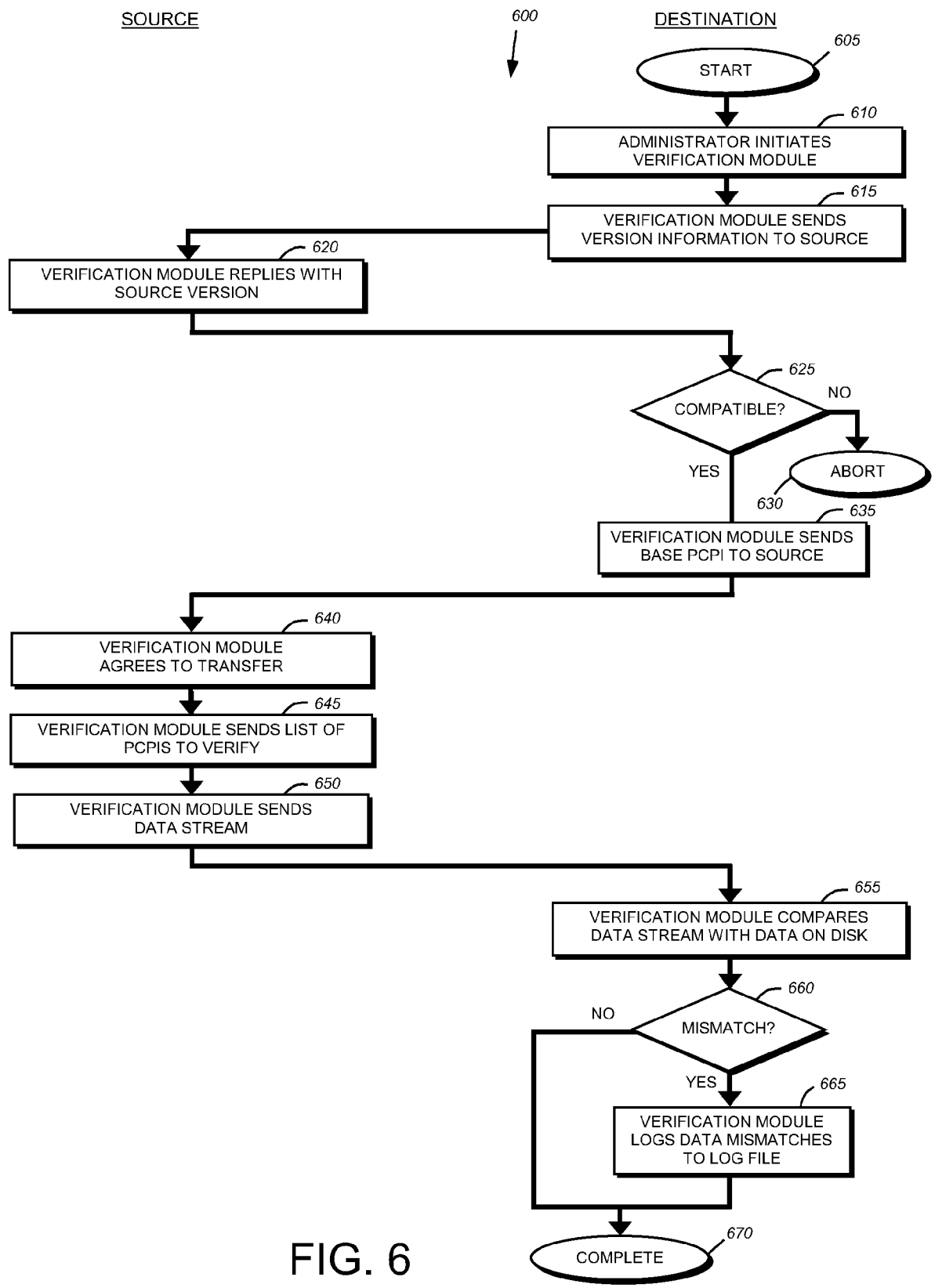
FIG. 6 is a flow chart detailing the steps of a procedure for verifying a mirrored data set in accordance with an illustrative embodiment of the present invention.

FIG. 6 is a flowchart detailing the steps of a procedure 600 for verifying mirrored data sets in accordance with an illustrative embodiment of the present invention. The procedure 600 begins in step 605 and continues to step 610 where an administrator initiates a destination verification module in accordance with an embodiment of the present invention. The verification module may be initiated via a command line interface (CLI) command or a graphical user interface (GUI). In alternate embodiments, the destination verification module may automatically be activated. For example, the system administrator may configure verification module to execute on a daily basis or, for example, at the conclusion of any mirroring activity. Once initiated, the destination verification module sends version information related to the version of the destination verification module to the source in step 615. In response, the source verification module replies with version of the source verification module in step 620. The destination verification module determines whether the source and destination versions are compatible in step 625. If they are not compatible, the procedure 600 then aborts in step 630. It should be noted that step 615-625 for version negotiation may be performed using alternate techniques including, e.g., a multi-round version negotiation to identify a common version to be utilized between the source and destination verification modules.

If the destination verification module determines in step 625 that the source and destination versions are compatible, the procedure 600 continues to step 635 where the destination verification module identifies and sends the identifier of a base PCPI to the source. Illustratively, the base PCPI is determined by identifying the most recent PCPI at the destination. However, in alternate embodiments, differing techniques may be utilized for identifying a base PCPI. For example, an administrator may desire to verify a particular PCPI, in which case, the selected PCPI may be user selected as the base PCPI. Once the base PCPI identification has been sent to the source verification module, the source verification module agrees to perform the transfer in step 640. If the base PCPI is not be available on the source, the verification module may disagree to perform the transfer. In such case, the procedure may abort. However, in alternate embodiments should the identified base PCPI not be available, then the source verification module may identify an alternate base PCPI and agree to perform the verification process using the alternate base PCPI. In step 645, the source verification module sends a list of PCPIs to verify to the destination. Illustratively, the list of PCPIs are the PCPIs up to the point in time identified by the base PCPI. PCPIs later in time that the base PCPI are not verified. Illustratively, the source destination verification module first sends a PCPI count data structure 700 (see FIG. 7). The PCPI count data structure alerts the destination verification module of the number and identification of PCPIs to be verified.

The source verification module generates and transmits a data stream to the destination verification module in step 650. This data stream, described further below in reference to FIG. 8 contains checksum information relating to particular blocks of the PCPIs to be verified along with a header information identifying which volumes etc. of a PCPI are being verified. The destination verification module compares the received data stream and the checksum information contained therein, with the checksum data stored on disk in step 655. A determination is made by the destination verification module, in step 660, whether any mismatches occur, i.e., whether data received from the source verification module differs from the data stored on disk. If a mismatch occurs, the procedure continues to step 665 where the destination verification module logs the data mismatch to a verification log file. The procedure 600 then completes in step 670. However, if in step 660 no mismatch has been identified, the procedure continues to step 670 and completes.

Figure 7:
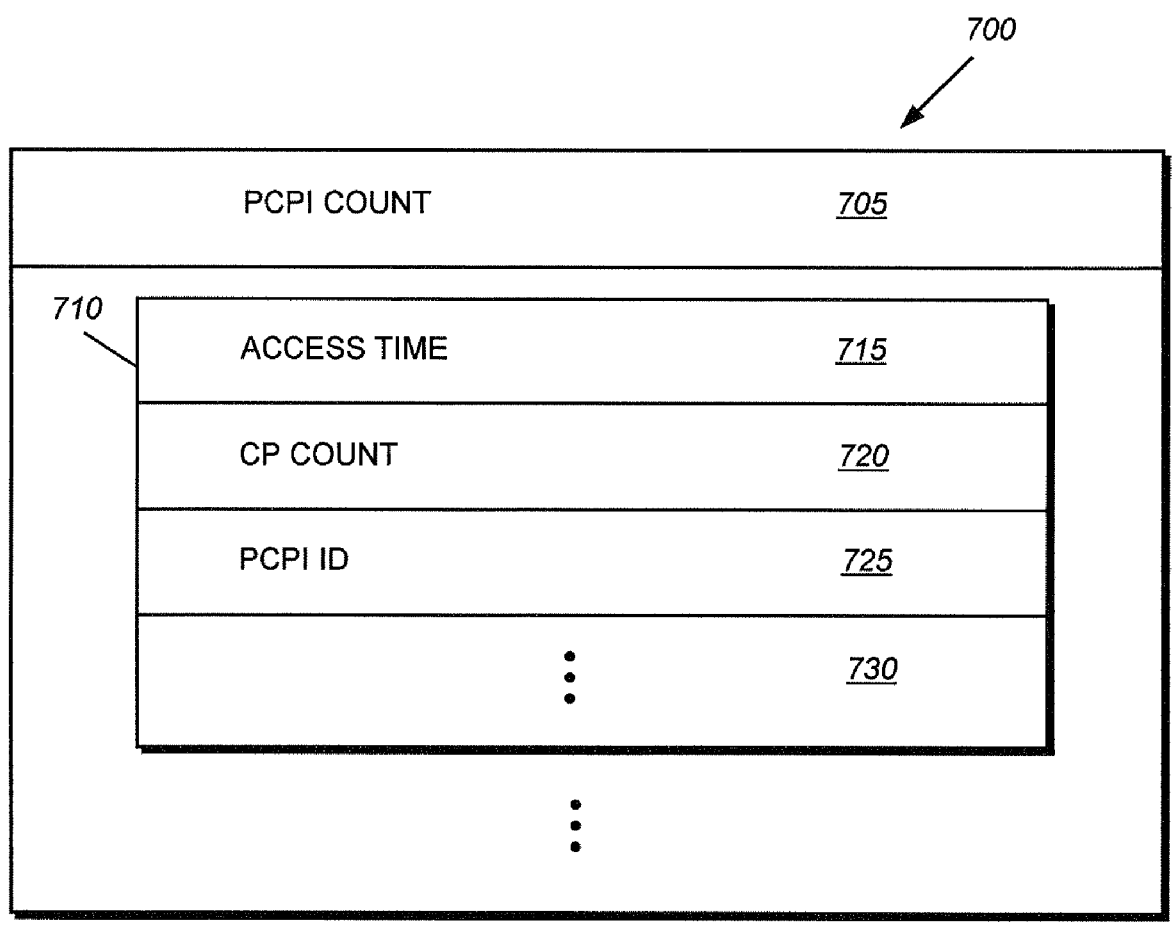
FIG. 7 is a schematic block diagram of an exemplary PCPI list data structure in accordance with an embodiment of the present invention.

FIG. 7 is a schematic block diagram of a PCPI count data structure 700 in accordance with an embodiment of the present invention. The PCPI count data structure 700 includes a PCPI count field 705 and that one or more entries 710. The PCPI count field 705 identifies the total number of PCPI identified within data structure 700. Each entry 710 is associated with a PCPI of the source storage system. Entries 710 illustratively contain an access time field 715, a consistency point count field 720, a PCPI ID field 725, and in alternate embodiments, additional field 730. The access time field 715 identifies the most recent time that a PCPI was accessed. The consistency point count field 720 identifies the consistency point (CP) at which the PCPI was generated. Illustratively, PCPIs are generated during CPs which are identified by a monotonically increasing number. A PCPI ID field 725 contains an identifier of the PCPI. Illustratively, the PCPI identifier field 725 contains a numeric identifier of the PCPI. However, in alternate embodiments, additional and/or differing forms of identifications may be used to signify the identity of a particular PCPI. As such, the description of a numeric PCPI ID should be taken as exemplary only.

Figure 8:
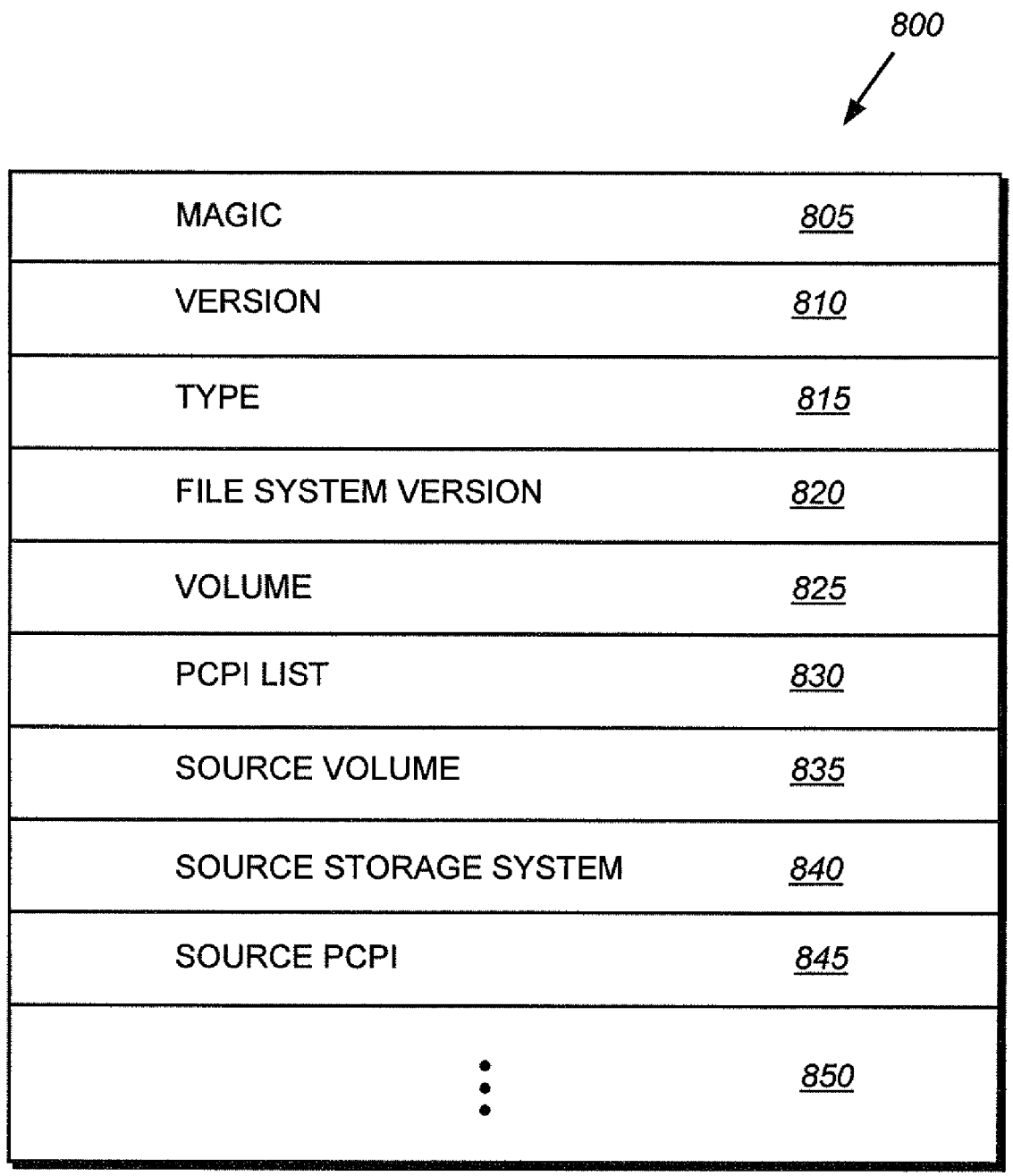
FIG. 8 is a schematic block diagram of an exemplary data stream header data structure in accordance with an embodiment of the present invention.

FIG. 8 is a schematic block diagram of an exemplary data stream header data structure 800 in accordance with an embodiment of the present invention. The header data structure 800 includes a magic field 805, a version field 810, a type field 815, a file system version field 820, a volume field 825, a PCPI list field 830, a source volume field 835, a source storage system field 840, a source PCPI field 845 and, in alternate embodiments additional fields 850. The magic field 805 contains a predetermined bit pattern identifying data structure 800 as a header for a data stream in accordance with an embodiment of the present invention the version field 810 identifies the current version of the source or of the header. The type field 815 identifies the type of a data being transmitted. The file system version field 820 identifies the version of the file system executing on the source storage system. As a checksum algorithms may change or be implemented in various manners in differing versions of file systems, the file system version field 820 enables the destination to identify an appropriate and compatible file system version to verify against checksums. The volume field 820 identifies the volume associated with the PCPIs being transmitted. The PCPI list array field 830 contains a list of PCPIs for which checksum information is being transmitted. The source volume field 835 identifies the source volume from the source storage system. Similarly, the source storage system field 840 identifies the storage system that is acting as the source. The source PCPI field 845 identifies the PCPI from which the checksum information is being obtained.

Thus, in the illustrative embodiment, the data stream may comprise of a header data structure 800 followed by one or more checksum blocks containing checksum information for the blocks of the PCPIs to be verified.

Figure 9:
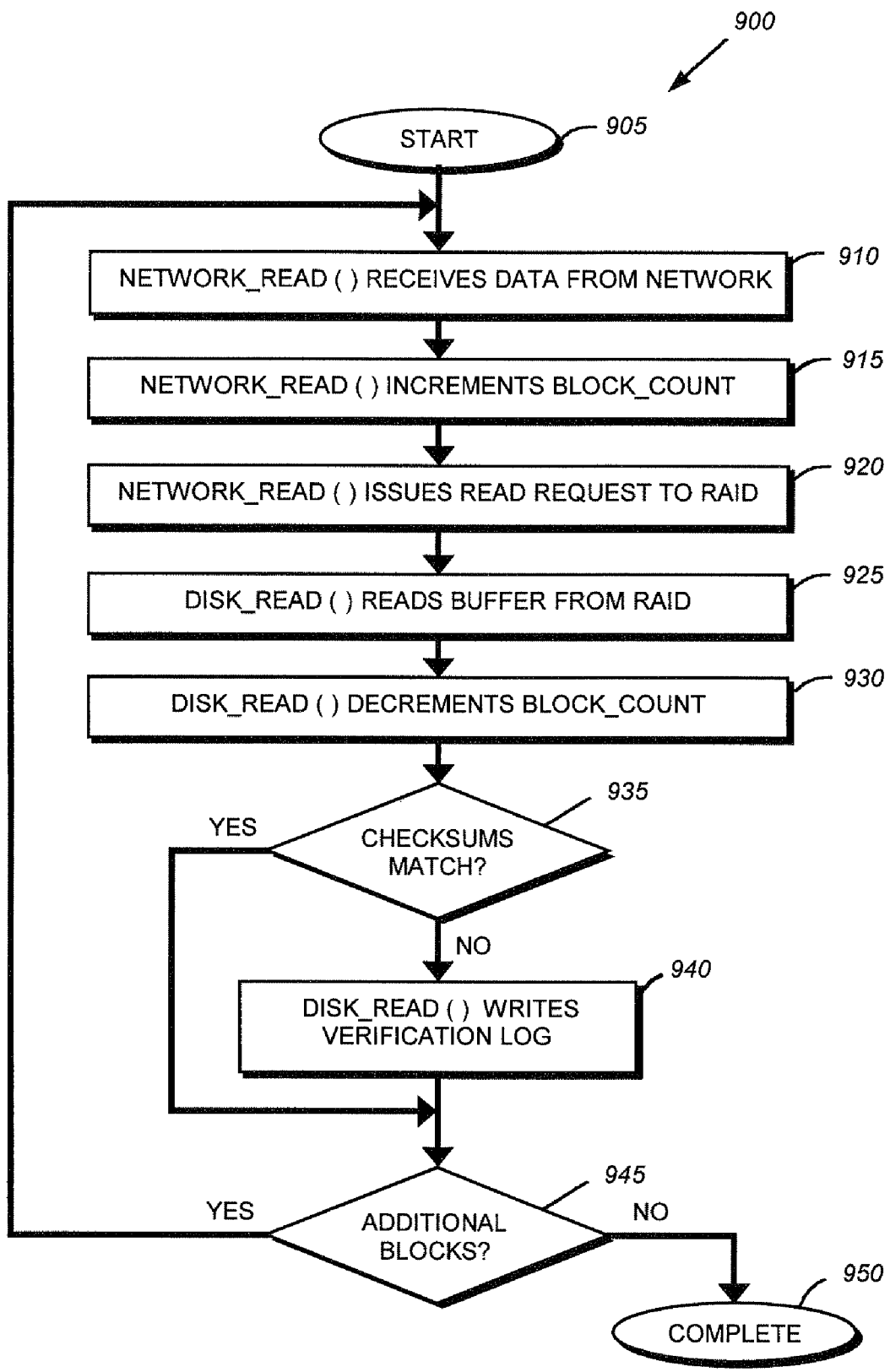
FIG. 9 is a flowchart detailing the steps of a procedure for processing and verifying received checksums in accordance with an embodiment of the present invention.

FIG. 9 is a flowchart detailing the steps of a procedure 900 for processing data from the source storage system for and comparing it with on disk data in accordance with an illustrative embodiment of the present invention. The procedure 900 begins in step 905 and continues to step 910 where the Network_Read( ) process 298 receives data from the network. Illustratively, Network_Read( ) processes incoming data from the source storage system by reading data from the network interconnecting the source and destination storage systems, i.e., by reading the incoming data stream generated by the source verification module. Then, in step 915, the Network_Read( ) process increments a Block_Count, which is illustratively a global variable accessible via both Network_Read( ) and Disk_Read( ) processes. By incrementing Block_Count, the Network_Read( ) process 298 identifies that an additional operation has been received from the network and is to be sent to the RAID module (disk storage module 260).

Once the Block_Count variable has been incremented, the Network_Read( ) process issues a read request to the RAID module 260 in step 920 to retrieve the appropriate checksum information from disk. Operating concurrently, in step 925, the Disk_Read( ) process 299 reads buffers retrieved from the RAID module 260. For every buffer read (representative of a block, such as a vbn), the Disk_Read( ) process decrements the Block_Counter in step 930. The Disk_Read( ) process then verifies that the checksums received from the source match the checksums retrieved from disk. If they do not, the Disk_Read( ) process writes a verification log entry in step 940. Once a verification log entry has been written, a determination is made whether additional blocks are to be read. If so, the procedure loops back to step 910. However, if no additional blocks are to be read, the procedure 900 completes in step 950.

Figure 10:
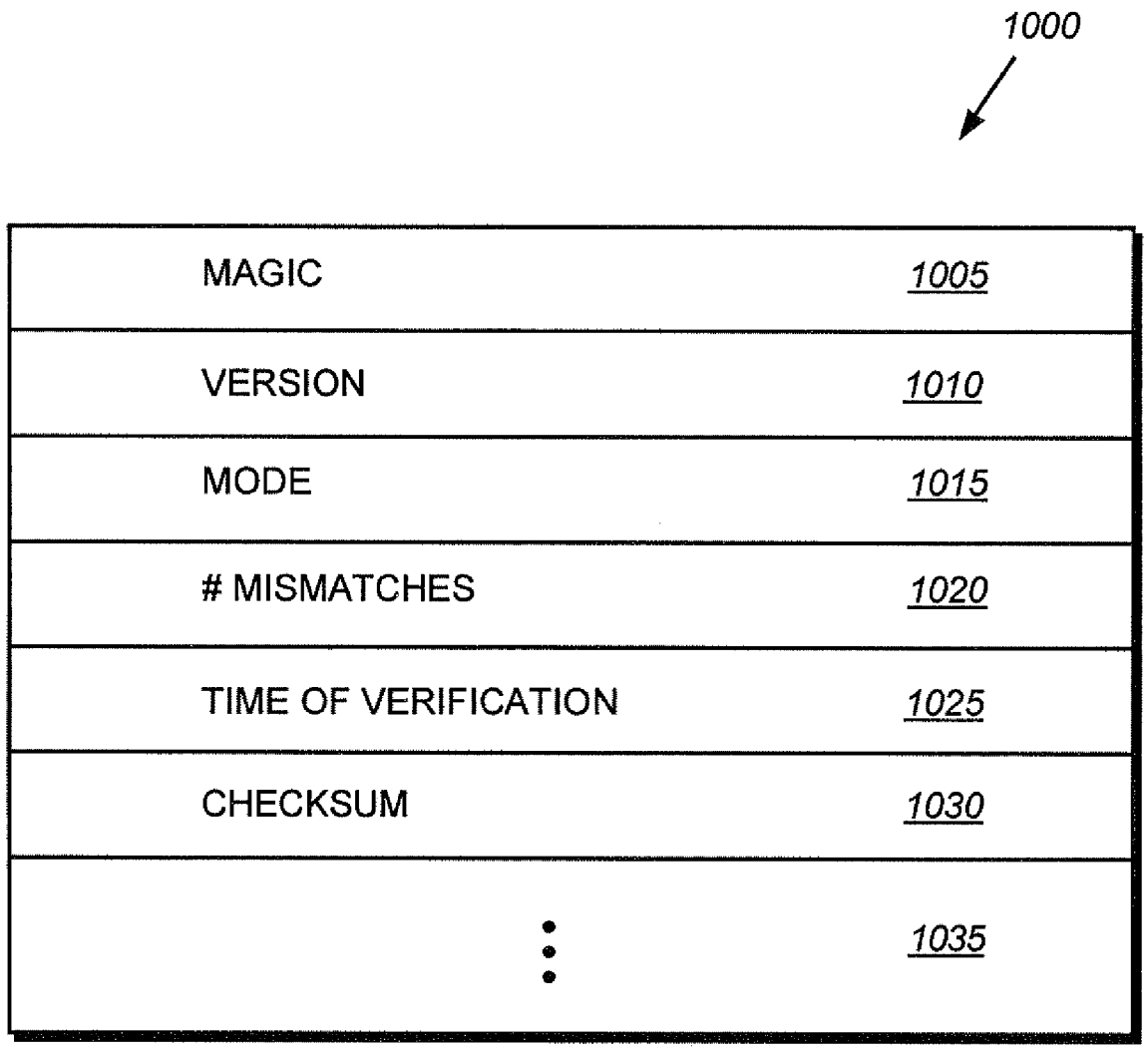
FIG. 10 is a schematic block diagram of an exemplary log file header data structure in a accordance with an embodiment of the present invention.

FIG. 10 is a schematic block diagram of an exemplary verification log header data structure 1000 accordance with an embodiment of the present invention. The data structure 1000 includes a magic field 1005, a version field 1010, a mode field 1015, and number of mismatches field 1020, a time of verification field 1025, a checksum field 1030 and, in alternate embodiments additional fields 1035. The magic field 1005 identifies that this data structure is a verification log file header data structure 1000. The version field 1010 identifies a version of the destination verification module writing the log file. The mode field 1015 identifies the type of mismatches to be stored. In the example of the present invention, the mode identifies that checksums have been verified. In accordance with alternate embodiments of the present invention, a full bit by bit comparison could occur instead of simply comparing checksums. The number of mismatches field 1020 identifies the total number of mismatches stored within the log file. The time of the verification field 1025 is the time at which the verification procedure was executed. The checksum field 1030 comprises a checksum of the header data structure 1000.

Figure 11:
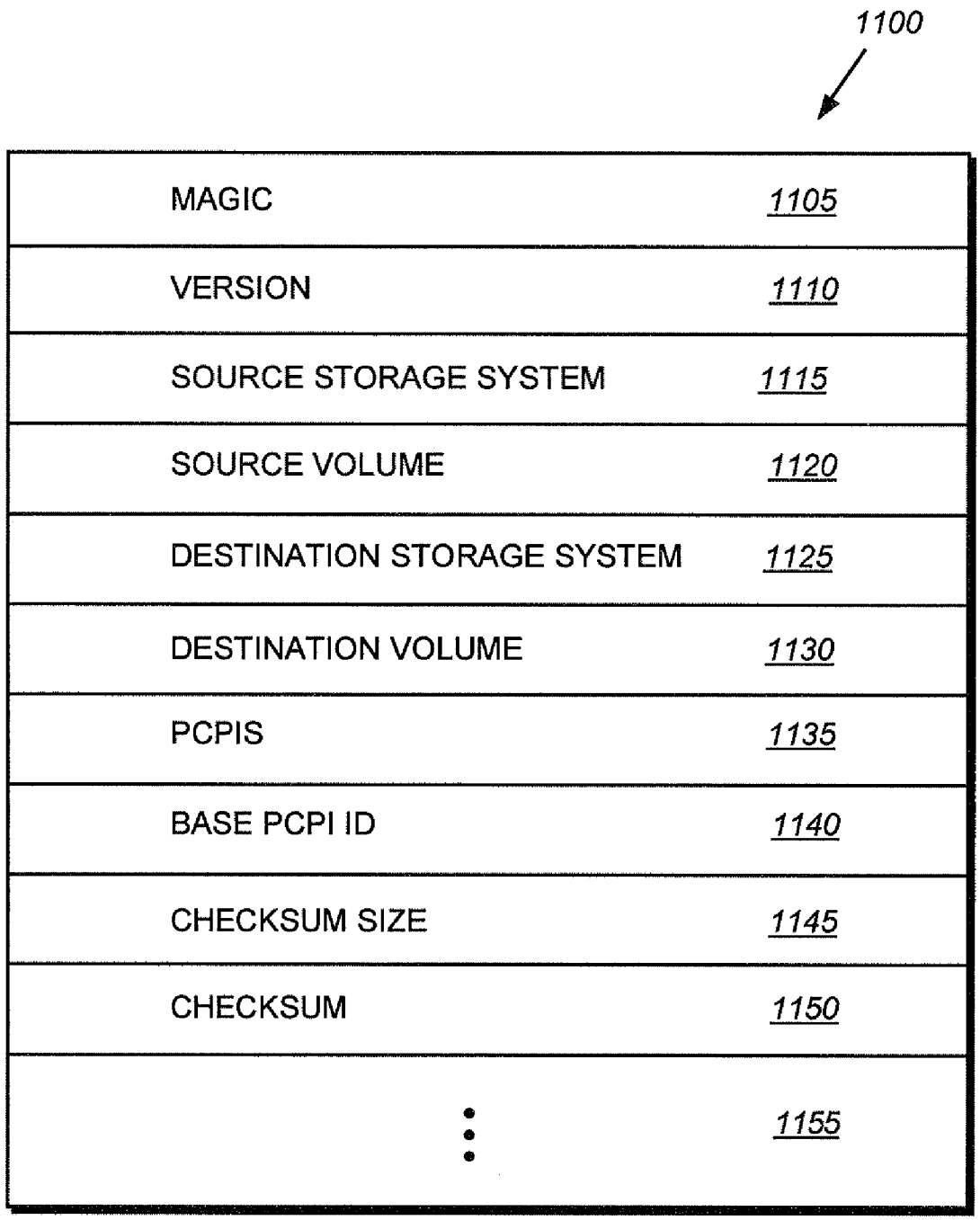
FIG. 11 is a schematic block diagram of an exemplary secondary log file header in accordance with an embodiment of the present invention.

FIG. 11 is a schematic block diagram of an exemplary verification subheader data structure 1100 in accordance with an embodiment of the present invention. The data structure 1100 includes a magic field 1105, a version field 1110, a source storage system 1115, a source volume field 1120, a destination storage system field 1125, a destination volume field 1130, a PCPI list field 1135, a base PCPI ID field 1140, a checksums size field 1145, a checksum field 1150 and, in alternate embodiments additional fields 1155. The magic field 1105 contains a bit pattern identifying data structure 1100 as a subheader data structure. The version field 1110 identifies the current version of the subheader data structure. The source storage system field 1115 identifies the source storage system from which the comparison is made. Similarly, the source volume field 1120 identifies the volume on the source storage system 1115 or from which I that was utilized in the comparison for verification process. The destination storage system field 1125 identifies the storage system destination storage system. The destination volume field 1130 identifies the volume on the destination storage system. The list of PCPI field 1135 contains a list of PCPIs which were verified in accordance with the present invention. The base PCPI ID field 1140 identifies the base PCPI that was utilized by the source and destination verification procedures. The checksums size field 1145 identifies the size of the checksums used in the verification. The checksum field 1150 contains a checksum of data structure 1100.

Figure 12:
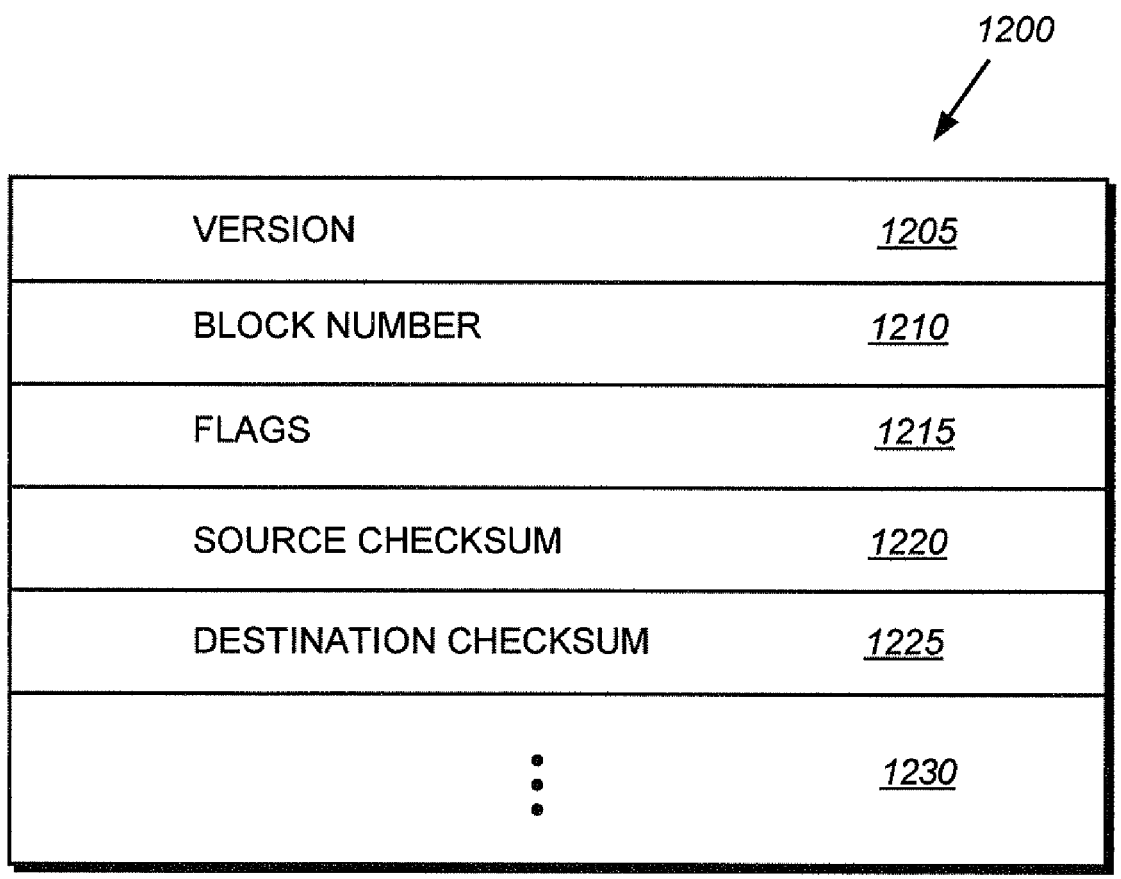
FIG. 12 is a schematic block diagram of an exemplary mismatch entry data structure in accordance with an embodiment of the present invention.

FIG. 12 is a schematic block diagram of an exemplary mismatch entry data structure 1200 in accordance with an embodiment of the present invention. Illustratively, a mismatch entry data structure 1200 is appended to the verification log file for each mismatch identified. Data structure 1200 includes a version field 1205, a block number field 1210, a flags field 1215, a source checksum field 1220, a destination checksum field 1225 and, in alternate embodiments, additional fields 1230. The version field identifies the version of the mismatch data structure being utilized. In alternate embodiments, the mismatch data structure 1200 may vary with differing versions. Thus, by containing the version, verification modules will be able to correctly interpret the contents of data structure 1200. The block number field 1210 identifies the particular block number at which a mismatch occurred. The flags field 1215 may contain flags identifying certain conditions. The source checksum field 1220 contains the checksum received from the source storage system. A destination checksum field 1225 contains checksum value received from the peer retrieved from disk at the destination.

The foregoing description has been directed to specific embodiments of this invention. It will be apparent, however, that other variations and modifications may be made to the described embodiments, but the attainment of some or all of their advantages. For instance, it is expressly contemplated that the teachings of this invention can be implemented as software, including a computer-readable medium having program instructions executing on a computer, hardware, firmware, or a combination thereof. Accordingly, this description is to be taken by way of example of and not to otherwise limit the scope of the invention. Therefore, it is the object of the appended claims to cover all such variations and modifications as come within the true spirit and scope of the invention.

What is claimed is:

1. A method for verifying data on a computer storage system, comprising:
hosting a first data set by a source computer;
hosting a second data set by a destination computer;
sending, from the source computer to the destination computer, a list of Persistent Consistency Point Images (PCPIs) for the first data set and the second data set:
sending, from the source computer to the destination computer, a data stream for the list of PCPIs and the first data set;
comparing information of the data stream at the destination computer with the second data set; and
in response to an inconsistency between the information of the data the second data set, logging the inconsistency to a verification log.

2. The method as in claim 1, wherein sending the data stream comprises sending a header data structure.

3. The method as in claim 1, wherein sending the data stream comprises sending checksum information associated with the first data set, and wherein comparing information of the data stream comprises comparing the checksum information in the data stream with checksum information associated with the second data set.

4. The method as in claim 1, further comprising:
identifying a base PCPI of the first data set and the second data set; and
wherein the list of PCPIs comprises one or more PCPIs of the first data set associated with a time prior to the base PCPI.

5. The method as in claim 1, further comprising:
wherein the first data set and the second data set comprise volumes.

6. The method as in claim 1, further comprising:
wherein the first data set and the second data set are in a mirroring relationship.

7. The method as in claim 1, further comprising:
ensuring that the source computer and the destination computer utilize a compatible version of a verification module executed on at least one of the source computer and the destination computer.

8. The method as in claim 4, further comprising:
sending, from the destination computer to the source computer, a PCPI identifier of the base PCPI.

9. A computer storage system apparatus for verifying data, comprising:
a source computer serving a first data set;
a destination computer operatively connected to the source computer, the destination computer serving a second data set;
the source computer further sending a list of a Persistent Consistency Point Images (PCPIs) for the first data set and the second data set to the destination computer;
the source computer further sending a data stream for the list of PCPIs and the first data set to the destination computer;
the destination computer further comparing information of the data stream with the second data set; and
at least one of the source computer and the destination computer, in response to an inconsistency between the information of the data stream and the second data set, to log the inconsistency to a verification login.

10. The apparatus as in claim 9, wherein the data stream comprises a header data structure.

11. The apparatus as in claim 9, wherein the data stream comprises checksum information associated with the first data set, and wherein the destination computer compares the checksum information in the data stream with checksum information associated with the second data set.

12. The apparatus as in claim 9, wherein the destination computer identifies a base PCPI of the first data set and the second data set, and wherein the list of PCPIs comprises one or more PCPIs of the first data set associated with a time prior to the base PCPI.

13. The apparatus as in claim 9, wherein the first data set and the second data set comprise volumes.

14. The apparatus as in claim 9, wherein the first data set and the second data set are in a mirroring relationship.

15. The apparatus as in claim 9, wherein the destination computer ensures that the source computer and the destination computer utilize a compatible version of a verification module configured to execute on at least one of the source computer and the destination computer.

16. The apparatus as in claim 12, wherein the destination computer sends a PCPI identifier of the base PCPI to the source computer.

17. A non-transitory computer-readable storage media device containing executable program instructions for execution by a processor, the computer-readable storage media device comprising:
    program instructions that receive, at a second computer to host a second data set, a list of Persistent Consistency Point Images (PCPIs) sent from a first to host a first data set, the list of PCPIs for the first data set and the second data set;
    program instructions that receive at the second computer a data stream sent from the first computer, the data stream for the list of PCPIs and the first data set;
    program instructions that compare at the second computer information of the data stream with the second data set; and
    program instructions that log the inconsistency at the second computer to a verification log in response to an inconsistency between the information of the data stream and the second data set.

18. The apparatus as in claim 9 wherein the verification log comprises a mismatch entry associated with the inconsistency.

19. The apparatus as in claim 11 wherein the checksum information comprises a RAID checksum.

20. The apparatus as in claim 10 wherein the header data structure comprises the list of PCPIs.

21. The apparatus as in claim 9 further comprising a first process configured to execute on the destination computer, the first process configured to read the data stream from a network operatively connecting the source computer and the destination computer.

22. The apparatus as in claim 21 further comprising a second process configured to execute on the destination computer, the second process configured to read the second data set from one or more storage devices operatively connected to the destination computer.

23. The apparatus as in claim 22 further comprising a counter on the destination computer shared between the first process and the second process, the first process configured to increment the counter in response to receiving an operation associated with the data stream from the network, the second process configured to decrement the counter in response to reading a block of the second data set stored at the destination computer.

* * * * *

UNITED STATES PATENT AND TRADEMARK OFFICE
CERTIFICATE OF CORRECTION

PATENT NO. : 8,301,791 B2
APPLICATION NO. : 12/129874
DATED : October 30, 2012
INVENTOR(S) : Prasanna Kumar Malaiyandi et al.

It is certified that error appears in the above-identified patent and that said Letters Patent is hereby corrected as shown below:

In col. 16, line 3 should read:
PIs) associated with the first data set and the second data set:

In col. 16, line 10 should read:
The data stream and the second data set, logging the inconsistency to In col. 16, line 41 should read:
A computer storage system apparatus configured to verify data, In col. 16, line 47 should read:
The source computer further sending a list of Persistent In col. 16, line 48 should read:
Consistency Point Images (PCPIs) associated with the first data set In col. 16, line 50 should read:
The source computer further configured to send a data stream associated with the In col. 16, line 56 should read:
Computer further configured, in response to an inconsistency between the In col. 16, line 58 should read:
Log the inconsistency to a verification log.

In col. 17, line 21 should read:
Program instructions that receive, at a second computer operable to In col. 17, line 23 should read:
Point Images (PCPIs) sent from a first computer to host a first data Signed and Sealed this
Nineteenth Day of November, 2013

Teresa Stanek Rea
*Deputy Director of the United States Patent and Trademark Office*